United States Patent
Wu et al.

(10) Patent No.: US 11,255,047 B2
(45) Date of Patent: Feb. 22, 2022

(54) PICKLED VEGETABLE-BASED EDIBLE PACKAGING PAPER AND PREPARATION METHOD THEREFOR

(71) Applicant: SHANGHAI JIAO TONG UNIVERSITY, ShangHai (CN)

(72) Inventors: Jinhong Wu, ShangHai (CN); Quan Jin, ShangHai (CN); Zhengwu Wang, ShangHai (CN); Qiaoyu Wu, ShangHai (CN); Wei Zhang, ShangHai (CN); Danlu Yang, ShangHai (CN); Ying Yu, ShangHai (CN); Wenhui Li, ShangHai (CN); Xinzhe Gu, ShangHai (CN); Shaoyun Wang, ShangHai (CN); Huiyun Chen, ShangHai (CN)

(73) Assignee: SHANGHAI JIAO TONG UNIVERSITY, ShangHai (CN)

( * ) Notice: Subject to any disclaimer, the term of this patent is extended or adjusted under 35 U.S.C. 154(b) by 0 days.

(21) Appl. No.: 16/450,977

(22) Filed: Jun. 24, 2019

(65) Prior Publication Data

US 2020/0399831 A1    Dec. 24, 2020

(51) Int. Cl.
| | | |
|---|---|---|
| *D21H 11/12* | (2006.01) | |
| *D21H 27/10* | (2006.01) | |
| *D21H 21/06* | (2006.01) | |
| *D21H 17/24* | (2006.01) | |
| *D21H 17/28* | (2006.01) | |
| *D21H 17/06* | (2006.01) | |
| *D21B 1/06* | (2006.01) | |
| *B65D 65/46* | (2006.01) | |
| *A23L 19/20* | (2016.01) | |
| *D21H 17/22* | (2006.01) | |

(52) U.S. Cl.
CPC ............. *D21H 11/12* (2013.01); *A23L 19/20* (2016.08); *B65D 65/463* (2013.01); *D21B 1/061* (2013.01); *D21H 17/06* (2013.01); *D21H 17/22* (2013.01); *D21H 17/24* (2013.01); *D21H 17/28* (2013.01); *D21H 21/06* (2013.01); *D21H 27/10* (2013.01); *A23V 2002/00* (2013.01)

(58) Field of Classification Search
CPC ........ D21H 17/08; D21H 17/28; A23L 19/20; B65D 65/463
USPC .......................................................... 162/10
See application file for complete search history.

*Primary Examiner* — Jacob T Minskey

(57) ABSTRACT

Disclosed in one aspect is a pickled vegetable-based edible packaging paper, the raw material of which is composed of the following components in parts by weight: 92-95 parts of a high dietary fiber-level pickled vegetable, a compounding thickener (0.6-0.8 parts of pectin, 0.6-0.8 parts of potato starch, and 0.2-0.4 parts of soy protein), and a compounding plasticizer (3-4 parts of sorbitol, and 0.5-1.5 parts of citral); and further disclosed in another aspect is a method for preparing a pickled vegetable-based edible packaging paper. The pickled vegetable paper of the present invention is a novel pickled vegetable-based product having both edible and practical functions, which product is rich in dietary fibers, retains the unique flavor and color of the pickled vegetable, has toughness and non-stickiness to teeth, and is soft and easy to process after being wetted.

2 Claims, No Drawings

PICKLED VEGETABLE-BASED EDIBLE PACKAGING PAPER AND PREPARATION METHOD THEREFOR

TECHNICAL FIELD

The present invention belongs to the technical field of foods. The present invention relates to an edible packaging paper and a preparation method therefor, and in particular to a pickled vegetable-based edible packaging paper and a preparation method therefor.

BACKGROUND ART

With the problem of white pollution and waste of resources caused by the difficulty in degrading packaging materials, people are actively looking for new resources that can replace traditional packaging materials. At the same time, the concept of green wrapping, namely, reduced packaging, repeatability, recyclability and degradability, emerges. In recent years, edible packaging materials with abundant raw material sources and no pollution have gradually become the focus of researchers.

The research and development of vegetable paper is first seen in Japan, the raw material of which may be fresh fruits and vegetables, or materials extracted from fruits and vegetables, e.g. proteins, fibers. Vegetable papers are safe and harmless while retaining the original flavor and nutrition of vegetables, they are suitable for inner packaging of instant noodles, seasonings and like foods as well as outer packaging of barbecue, cakes, rice balls and like foods.

The research and development of vegetable papers not only provide a new type of food for the society, but also increases the economic value of vegetables, and can realize the deep processing of vegetable resources. There are abundant vegetable raw materials in countries across the world; however, the vegetable processing industry has a low rate of utilization of resources, few vegetable deep processing products, and monotonous vegetable product forms.

As a new type of convenient and functional edible packaging paper, vegetable paper is of a great significance to both the development of the industry of agricultural and sideline products and the sustainable development of society.

SUMMARY OF THE INVENTION

An object of the present invention is to provide a pickled vegetable-based edible packaging paper which is rich in dietary fibers, tough, non-sticky, and non-fragile when being encountered with water, and has a unique pickled vegetable flavor.

In order to achieve the above object, the present invention provides a pickled vegetable-based edible packaging paper, characterized in that the raw material of the paper is composed of the following components in parts by weight: 92-95 parts of a high dietary fiber-level pickled vegetable, 1.4-2.0 parts of a compounding thickener, and 3.5-5.5 parts of a compounding plasticizer.

Furthermore, the pickled vegetable therein is a high dietary fiber-level pickled vegetable rich in soluble dietary fibers, which results from the improvement, treatment and fermentation of green mustard as a raw material by means of a certain processing process.

Furthermore, the compounding thickener therein is composed of 0.6-0.8 parts of pectin, 0.6-0.8 parts of potato starch, and 0.2-0.4 parts of soy protein.

Furthermore, the compounding plasticizer therein is composed of 3-4 parts of sorbitol and 0.5-1.5 parts of citral.

In another aspect, the present invention further provides a method for preparing a pickled vegetable-based edible packaging paper, comprising the following steps:

1. Acquiring a pickled vegetable raw material: the pickled vegetable raw material required for the edible packaging paper is prepared from green mustard as a raw material;

2. Cleaning, crushing and beating said pickled vegetable: a finished pickled vegetable product of a good quality is selected, which is required to be fresh in raw material and have no deterioration and no mildew and rot, and the pickled vegetable is cut and placed into a beater for preliminary crushing, and is subjected to fiber disintegration to obtain mixed liquid I;

3. Adding a thickener and a plasticizer: the thickener and the plasticizer are added to mixed liquid I, fully dissolved, and poured into a container of a homogenizer;

4. Sufficient refining to obtain mixed liquid II;

5. Vacuum degassing: homogenized mixed liquid II is placed in a vacuum degasser for degassing to remove gas between tissue cells, which facilitates subsequent formation, to obtain mixed liquid III;

6. Coating formation: mixed liquid III obtained above is poured and uniformly applied onto a forming support;

7. Baking drying: baking drying is carried out in a suitable environment with constant observation; and 8. Peeling: a dried paper sheet is separated from the forming support to obtain a finished product.

Furthermore, in Step 2, preliminary crushing is carried out in the beater, with the crushing knife distance being 0-5.0 mm, the crushing time being 60 s, and the crushing degree index being 1500 r.

Furthermore, in Step 2, a fiber disintegrator is used for fiber disintegration, with the rotation speed being 3000 r/min, the crushing time being 30-90 s, and the crushing degree index being 5000 r.

Furthermore, in Step 4, the time of homogenization refinement is 5 min.

Furthermore, in Step 5, during the vacuum degassing, the degree of vacuum is 0.09 MPa, and the vacuum time is 5 min.

Furthermore, in Step 6, automated homogenization is carried out, with a slurry concentration of 0.1%, and then it is uniformly applied onto a support.

Furthermore, the support in Step 6 is a 100-mesh stainless steel mesh.

Furthermore, in Step 7, a vacuum drying oven is used for baking drying.

Furthermore, in Step 7, the baking drying environment is a temperature of 70° C.-90° C. and a vacuum pressure of 0.01-0.09 MPa, and the baking drying time is 10-12 min.

Compared with the prior art, the beneficial effects of the present invention are as follows:

1. The raw material is composed of a pickled vegetable and bamboo shoots, wherein the process for the pickled vegetable is obtained by optimizing traditional processes in laboratory, the prepared pickled vegetable is rich in high-quality dietary fibers, and the nutritional added value of this product is increased.

2. The thickener and the plasticizer in the pickled vegetable paper are all compounds, the formulas of which are obtained by screening and optimizing common additives in studies, and which effectively compensates for the insufficiency of a single thickener and plasticizers and well improve the properties of the product.

3. Vacuum drying is used in the process for preparing the pickled vegetable paper to ensure the production efficiency while ensuring the product quality.

DETAILED DESCRIPTION OF EMBODIMENTS

The present invention is further described in detail below in combination with particular examples. It is to be understood that the specific examples described herein are merely illustrative of the invention and are not intended to limit the invention.

Example 1

Step 1. Acquiring a pickled vegetable raw material: 1000 g of green mustard is trimmed and cut into an appropriate size, washed with water, drained, and then treated at an ultrahigh pressure of 400 MPa for 15 min, 4000 g of a pickling brine prepared with a low concentration of 4%, which contains white granulated sugar at a mass concentration of 3%, is then added thereto along with 90 g of *Lactobacillus plantarum* and 15 g of *Pediococcus*, and the mixture is poured into a high-temperature sterilized pickling jar, fed in with an appropriate amount of seasoning, and then placed in an incubator for fermentation (at 25° C.) for 5 d.

Step 2. Cleaning, crushing and beating said pickled vegetable: 250 g of a finished pickled green mustard of a good quality, which is fresh in raw material and has no deterioration and no mildew and rot, and 50 g of bamboo shoots are selected, cut, and placed into a beater for preliminary crushing, with the crushing knife distance being 0-5.0 mm, the crushing time being 60 s, and the crushing degree index being 1500 r.

Pickled vegetable fiber disintegration: a fiber disintegrator is employed to obtain mixed liquid I, with the rotation speed being 3000 r/min, the crushing time being 30-90 s, and the crushing degree index being 5000 r.

Step 3. Adding a thickener and a plasticizer, wherein the thickener comprises: pectin, potato starch and soy protein, wherein the pectin is added in an amount of 0.7%, the potato starch is added in an amount of 0.7%, and the soy protein is added in an amount of 0.3%; and the plasticizer comprises sorbitol and citral, wherein the sorbitol is added in an amount of 3.5%, and the citral is added in an amount of 1%.

Step 4. Homogenization refinement: the thickener and the plasticizer are added to mixed liquid I, fully dissolved, poured into a container of a homogenizer, and fully refined for 5 min under 1000 R conditions to obtain mixed liquid II.

Step 5. Vacuum degassing: homogenized mixed liquid II is placed in a vacuum degasser for degassing with a vacuum degree of 0.09 MPa and a vacuum time of 5 min to remove gas between tissue cells, which facilitates subsequent formation, to obtain mixed liquid III.

Step 6. Coating formation: mixed liquid III obtained above is subjected to automated homogenization in a paper sheet former, with a slurry concentration of 0.1%, and is then uniformly applied onto a 100-mesh stainless steel mesh.

Step 7. Baking drying: baking drying is carried out for 10 min in a vacuum drying oven at a temperature of 85° C. and a vacuum pressure of 0.02 MPa.

Step 8. Peeling: a dried paper sheet is separated from the forming support to obtain a finished product.

Example 2

Step 1. Acquiring a pickled vegetable raw material: 1000 g of green mustard is trimmed and cut into an appropriate size, washed with water, drained, and then treated at an ultrahigh pressure of 400 MPa for 15 min, 4000 g of a pickling brine prepared with a low concentration of 4%, which contains white granulated sugar at a mass concentration of 3%, is then added thereto along with 90 g of *Lactobacillus plantarum* and 15 g of *Pediococcus*, and the mixture is poured into a high-temperature sterilized pickling jar, fed in with an appropriate amount of seasoning, and then placed in an incubator for fermentation (at 25° C.) for 5 d.

Step 2. Cleaning, crushing and beating said pickled vegetable: 300 g of a finished pickled green mustard of a good quality, which is fresh in raw material and has no deterioration and no mildew and rot, and 50 g of bamboo shoots are selected, cut, and placed into a beater for preliminary crushing, with the crushing knife distance being 0-5.0 mm, the crushing time being 60 s, and the crushing degree index being 1500 r.

Pickled vegetable fiber disintegration: a fiber disintegrator is employed to obtain mixed liquid I, with the rotation speed being 3000 r/min, the crushing time being 30-90 s, and the crushing degree index being 5000 r.

Step 3. Adding a thickener and a plasticizer, wherein the thickener comprises: pectin, potato starch and soy protein, wherein the pectin is added in an amount of 0.6%, the potato starch is added in an amount of 0.5%, and the soy protein is added in an amount of 0.4%; and the plasticizer comprises sorbitol and citral, wherein the sorbitol is added in an amount of 4.0%, and the citral is added in an amount of 1.8%.

Step 4. Homogenization refinement: the thickener and the plasticizer are added to mixed liquid I, fully dissolved, poured into a container of a homogenizer, and fully refined for 5 min under 800 R conditions to obtain mixed liquid II.

Step 5. Vacuum degassing: homogenized mixed liquid II is placed in a vacuum degasser for degassing with a vacuum degree of 0.06 MPa and a vacuum time of 5 min to remove gas between tissue cells, which facilitates subsequent formation, to obtain mixed liquid III.

Step 6. Coating formation: mixed liquid III obtained above is subjected to automated homogenization in a paper sheet former, with a slurry concentration of 0.1%, and is then uniformly applied onto a 100-mesh stainless steel mesh.

Step 7. Baking drying: baking drying is carried out for 12 min in a vacuum drying oven at a temperature of 70° C. and a vacuum pressure of 0.02 MPa.

Step 8. Peeling: a dried paper sheet is separated from the forming support to obtain a finished product.

Example 3

Step 1. Acquiring a pickled vegetable raw material: 1000 g of green mustard is trimmed and cut into an appropriate size, washed with water, drained, and then treated at an ultrahigh pressure of 400 MPa for 15 min, 4000 g of a pickling brine prepared with a low concentration of 4%, which contains white granulated sugar at a mass concentration of 3%, is then added thereto along with 90 g of *Lactobacillus plantarum* and 15 g of *Pediococcus*, and the mixture is poured into a high-temperature sterilized pickling jar, fed in with an appropriate amount of seasoning, and then placed in an incubator for fermentation (at 25° C.) for 5 d.

Step 2. Cleaning, crushing and beating said pickled vegetable: 250 g of a finished pickled green mustard of a good quality, which is fresh in raw material and has no deterioration and no mildew and rot, and 50 g of bamboo shoots are selected, cut, and placed into a beater for preliminary crushing, with the crushing knife distance being 0-5.0 mm, the crushing time being 60 s, and the crushing degree index being 1500 r.

Pickled vegetable fiber disintegration: a fiber disintegrator is employed to obtain mixed liquid I, with the rotation speed being 3000 r/min, the crushing time being 30-90 s, and the crushing degree index being 5000 r.

Step 3. Adding a thickener and a plasticizer, wherein the thickener comprises: pectin, potato starch and soy protein, wherein the pectin is added in an amount of 0.5%, the potato starch is added in an amount of 0.7%, and the soy protein is added in an amount of 0.4%; and the plasticizer comprises sorbitol and citral, wherein the sorbitol is added in an amount of 3.0%, and the citral is added in an amount of 1.5%.

Step 4. Homogenization refinement: the thickener and the plasticizer are added to mixed liquid I, fully dissolved, poured into a container of a homogenizer, and fully refined for 5 min under 900 R conditions to obtain mixed liquid II.

Step 5. Vacuum degassing: homogenized mixed liquid II is placed in a vacuum degasser for degassing with a vacuum degree of 0.09 MPa and a vacuum time of 5 min to remove gas between tissue cells, which facilitates subsequent formation, to obtain mixed liquid III.

Step 6. Coating formation: mixed liquid III obtained above is subjected to automated homogenization in a paper sheet former, with a slurry concentration of 0.1%, and is then uniformly applied onto a 100-mesh stainless steel mesh.

Step 7. Baking drying: baking drying is carried out for 10 min in a vacuum drying oven at a temperature of 75° C. and a vacuum pressure of 0.02 MPa.

Step 8. Peeling: a dried paper sheet is separated from the forming support to obtain a finished product.

Example 4

Step 1. Acquiring a pickled vegetable raw material: 1000 g of green mustard is trimmed and cut into an appropriate size, washed with water, drained, and then treated at an ultrahigh pressure of 400 MPa for 15 min, 4000 g of a pickling brine prepared with a low concentration of 4%, which contains white granulated sugar at a mass concentration of 3%, is then added thereto along with 90 g of *Lactobacillus plantarum* and 15 g of *Pediococcus*, and the mixture is poured into a high-temperature sterilized pickling jar, fed in with an appropriate amount of seasoning, and then placed in an incubator for fermentation (at 25° C.) for 5 d.

Step 2. Cleaning, crushing and beating said pickled vegetable: 250 g of a finished pickled green mustard of a good quality, which is fresh in raw material and has no deterioration and no mildew and rot, and 50 g of bamboo shoots are selected, cut, and placed into a beater for preliminary crushing, with the crushing knife distance being 0-5.0 mm, the crushing time being 60 s, and the crushing degree index being 1500 r.

Pickled vegetable fiber disintegration: a fiber disintegrator is employed to obtain mixed liquid I, with the rotation speed being 3000 r/min, the crushing time being 30-90 s, and the crushing degree index being 5000 r.

Step 3. Adding a thickener and a plasticizer, wherein the thickener comprises: pectin, potato starch and soy protein, wherein the pectin is added in an amount of 0.5%, the potato starch is added in an amount of 0.6%, and the soy protein is added in an amount of 0.3%; and the plasticizer comprises sorbitol and citral, wherein the sorbitol is added in an amount of 2.0%, and the citral is added in an amount of 1.3%.

Step 4. Homogenization refinement: the thickener and the plasticizer are added to mixed liquid I, fully dissolved, poured into a container of a homogenizer, and fully refined for 5 min under 1500 R conditions to obtain mixed liquid II.

Step 5. Vacuum degassing: homogenized mixed liquid II is placed in a vacuum degasser for degassing with a vacuum degree of 0.05 MPa and a vacuum time of 5 min to remove gas between tissue cells, which facilitates subsequent formation, to obtain mixed liquid III.

Step 6. Coating formation: mixed liquid III obtained above is subjected to automated homogenization in a paper sheet former, with a slurry concentration of 0.1%, and is then uniformly applied onto a 100-mesh stainless steel mesh.

Step 7. Baking drying: baking drying is carried out for 12 min in a vacuum drying oven at a temperature of 75° C. and a vacuum pressure of 0.02 MPa.

Step 8. Peeling: a dried paper sheet is separated from the forming support to obtain a finished product.

Example 5

Step 1. Acquiring a pickled vegetable raw material: 1000 g of green mustard is trimmed and cut into an appropriate size, washed with water, drained, and then treated at an ultrahigh pressure of 400 MPa for 15 min, 4000 g of a pickling brine prepared with a low concentration of 4%, which contains white granulated sugar at a mass concentration of 3%, is then added thereto along with 90 g of *Lactobacillus plantarum* and 15 g of *Pediococcus*, and the mixture is poured into a high-temperature sterilized pickling jar, fed in with an appropriate amount of seasoning, and then placed in an incubator for fermentation (at 25° C.) for 5 d.

Step 2. Cleaning, crushing and beating said pickled vegetable: 300 g of a finished pickled green mustard of a good quality, which is fresh in raw material and has no deterioration and no mildew and rot, and 50 g of bamboo shoots are selected, cut, and placed into a beater for preliminary crushing, with the crushing knife distance being 0-5.0 mm, the crushing time being 60 s, and the crushing degree index being 1500 r.

Pickled vegetable fiber disintegration: a fiber disintegrator is employed to obtain mixed liquid I, with the rotation speed being 3000 r/min, the crushing time being 30-90 s, and the crushing degree index being 5000 r.

Step 3. Adding a thickener and a plasticizer, wherein the thickener comprises: pectin, potato starch and soy protein, wherein the pectin is added in an amount of 0.5%, the potato starch is added in an amount of 0.7%, and the soy protein is added in an amount of 0.2%; and the plasticizer comprises sorbitol and citral, wherein the sorbitol is added in an amount of 2.5%, and the citral is added in an amount of 2.0%.

Step 4. Homogenization refinement: the thickener and the plasticizer are added to mixed liquid I, fully dissolved, poured into a container of a homogenizer, and fully refined for 5 min under 1000 R conditions to obtain mixed liquid II.

Step 5. Vacuum degassing: homogenized mixed liquid II is placed in a vacuum degasser for degassing with a vacuum degree of 0.09 MPa and a vacuum time of 5 min to remove gas between tissue cells, which facilitates subsequent formation, to obtain mixed liquid III.

Step 6. Coating formation: mixed liquid III obtained above is subjected to automated homogenization in a paper sheet former, with a slurry concentration of 0.1%, and is then uniformly applied onto a 100-mesh stainless steel mesh.

Step 7. Baking drying: baking drying is carried out for 8 min in a vacuum drying oven at a temperature of 90° C. and a vacuum pressure of 0.02 MPa.

Step 8. Peeling: a dried paper sheet is separated from the forming support to obtain a finished product.

Example 6

Step 1. Acquiring a pickled vegetable raw material: 1000 g of green mustard is trimmed and cut into an appropriate size, washed with water, drained, and then treated at an ultrahigh pressure of 400 MPa for 15 min, 4000 g of a pickling brine prepared with a low concentration of 4%, which contains white granulated sugar at a mass concentration of 3%, is then added thereto along with 90 g of *Lactobacillus plantarum* and 15 g of *Pediococcus*, and the mixture is poured into a high-temperature sterilized pickling jar, fed in with an appropriate amount of seasoning, and then placed in an incubator for fermentation (at 25° C.) for 5 d.

Step 2. Cleaning, crushing and beating said pickled vegetable: 250 g of a finished pickled green mustard of a good quality, which is fresh in raw material and has no deterioration and no mildew and rot, and 80 g of bamboo shoots are selected, cut, and placed into a beater for preliminary crushing, with the crushing knife distance being 0-5.0 mm, the crushing time being 60 s, and the crushing degree index being 1500 r.

Pickled vegetable fiber disintegration: a fiber disintegrator is employed to obtain mixed liquid I, with the rotation speed being 3000 r/min, the crushing time being 30-90 s, and the crushing degree index being 5000 r.

Step 3. Adding a thickener and a plasticizer, wherein the thickener comprises: pectin, potato starch and soy protein, wherein the pectin is added in an amount of 0.7%, the potato starch is added in an amount of 0.7%, and the soy protein is added in an amount of 0.3%; and the plasticizer comprises sorbitol and citral, wherein the sorbitol is added in an amount of 3.5%, and the citral is added in an amount of 1%.

Step 4. Homogenization refinement: the thickener and the plasticizer are added to mixed liquid I, fully dissolved, poured into a container of a homogenizer, and fully refined for 5 min under 1200 R conditions to obtain mixed liquid II.

Step 5. Vacuum degassing: homogenized mixed liquid II is placed in a vacuum degasser for degassing with a vacuum degree of 0.07 MPa and a vacuum time of 5 min to remove gas between tissue cells, which facilitates subsequent formation, to obtain mixed liquid III.

Step 6. Coating formation: mixed liquid III obtained above is subjected to automated homogenization in a paper sheet former, with a slurry concentration of 0.1%, and is then uniformly applied onto a 100-mesh (XX mesh to XXX mesh) stainless steel mesh.

Step 7. Baking drying: baking drying is carried out for 11 min in a vacuum drying oven at a temperature of 75° C. and a vacuum pressure of 0.02 MPa.

Step 8. Peeling: a dried paper sheet is separated from the forming support to obtain a finished product.

Example 7

Technical performance test on pickled vegetable-based edible packaging paper 1. Paper thickness is one of the direct factors affecting the physical and optical properties thereof, and it also affects the barrier properties and strength thereof, and is also a basic element for calculating some other paper performance indicators. Contact measurement method [1] is a more commonly used method for measuring the thickness of paper, and therefore, this method is used in this experiment to determine the thickness of the pickled vegetable-based edible packaging paper.

Measurement is carried out 3 times using a micrometer at points randomly taken from a sample to be tested, and the average value thereof in unit of mm is taken. After detection, the pickled vegetable-based edible packaging paper of the present invention can achieve 0.185 mm.

2. Elongation at break and tensile strength are two main evaluation indexes for the mechanical properties of a paper product, wherein the elongation at break is used for measuring the toughness of the product and is positively correlated with toughness, and the tensile strength is used for measuring the resistance of the product to external tensile stretching. This study involves determination using a tensile strength tester according to GB 13022-1991 "Plastics—Determination of tensile properties of films", wherein the sample has a long strip shape, the length and width of which are respectively 50 mm and 15 mm, the sample speed is 50 mm/min, the elongation at break is expressed by E (%), and the tensile strength is expressed by TS in unit of N/m, with the calculation formulas of the two indicators being respectively:

$$E=(L-L_0)/L_0\times 100\%$$

in which $L_0$—the length of the sample product before tensile testing, in mm; and L—the length of the sample product at tensile failure, in mm; and $$TS=F/B$$

in which F—the maximum tension that the sample product bears at break, in N; and D—the width of the sample product before tensile strength test, m.

After detection, the pickled vegetable-based edible packaging paper of the present invention has a tensile strength of 2377.03 N/m and an elongation at break of 4.64%.

3. Water solubility rate refers to the content of substances dissolved in water after the sample is immersed in water for 24 hours. Measurement method[6] therefor: three samples of a size 20 mm×20 mm are cut, placed in a 100 ml beaker, placed together with the beaker into an oven at 105° C. overnight, dried until the weight is constant, and weighed, and the initial mass of the sample and the total mass of the sample and the beaker are recorded. Then, 50 mL of distilled water is added, and the mixture is immersed for 24 hours at room temperature; the water in the beaker is poured off, and the remaining sample is placed in a 105° C. oven overnight with the beaker, dried to a constant weight, and the total mass of the sample and the beaker is weighed and recorded. The water solubility rate is expressed by S (%) and is calculated by means of the following formula:

$$S=(W_1-W_2)/W_0\times 100\%$$

in which $W_1$— total mass of the beaker and the sample after drying, in g; $W_2$-total mass of the beaker and the soaked sample after drying, in g; and $W_0$— the mass of the sample, in g.

After detection, the pickled vegetable-based edible packaging paper of the present invention has a water solubility rate of 2.9119%. 4. The oil barrier of a vegetable packing paper is measured by means of a method for measuring the oil permeability coefficient of a film. Specific measurement method: 5 ml of sunflower oil is added into a test tube, the test tube is sealed with a paper to be tested and is tightened with a rubber band, the test tube is inverted against the filter paper and left to stand for 2 days, and the mass of the filter paper is weighed respectively before and after testing, wherein the oil permeability coefficient thereof is expressed by PO, in unit of g·mm/(m²·d), and is calculated by means of the following formula:

$$PO=(\Delta W \times FT)/(S \times T)$$

in which ΔW—change in the mass of the filter paper, in g; FT—film thickness, in mm; S—film area, in m²; and T—storage time (d), wherein the storage time for this test is 2 d.

After detection, the pickled vegetable-based edible packaging paper of the present invention has an oil permeability coefficient of 2.9119%.

5. Transparency reflects the light transmittance of a paper, and the essence thereof is the light scattering result of the "optically uniform" structure of the paper; the mechanism of affecting transparency includes the refraction, reflection, absorption and diffraction of light. According to a method from a reference document, a sample to be tested is cut into long strips, the long strip is tightly adhered to the surface of a cuvette, and the light transmittance thereof is measured at a wavelength of 600 nm, wherein a blank cuvette is used as a control group.

After detection, the pickled vegetable-based edible packaging paper of the present invention has a light transmittance of 0.7%.

The specific preferred embodiments of the present invention are described in detail above. It should be appreciated that a person of ordinary skill in the art would be able to make modifications and variations in accordance with the concept of the present invention without involving any inventive effort. Therefore, any technical solution that can be obtained by a person skilled in the art by means of logical analysis, reasoning or limited trials on the basis of the prior art and according to the concept of the present invention should be included within the scope of protection of the claims.

We claim:

1. A pickled vegetable-based edible packaging paper comprising 92-95 weight parts of a pickled vegetable, 1.4-2.0 weight parts of a compounding thickener, 3.5-5.5 weight parts of a compounding plasticizer and a bamboo, wherein a mass ratio of said bamboo to said pickled vegetable is 1:6~8:25;

wherein 1.4-2.0 weight parts of said compounding thickener is consisting of 0.6-0.8 weight parts of pectin, 0.6-0.8 weight parts of potato starch, and 0.2-0.4 weight parts of soy protein, 3.5-5.5 weight parts of said compounding plasticizer is consisting of 3-4 weight parts of sorbitol and 0.5-1.5 weight parts of citral;

wherein said pickled vegetable-based edible packaging paper is prepared by a method as follows:

(1) preparation of a first mixed liquid: said pickled vegetable and said bamboo are cut and placed into a beater for preliminary crushing, and is subjected to fiber disintegration to obtain the first mixed liquid;

(2) preparation of a second mixed liquid: said compounding thickener and said compounding plasticizer are added to said first mixed liquid, dissolved, poured into a container of a homogenizer and refined to obtain the second mixed liquid;

(3) preparation of a third mixed liquid: said second mixed liquid is placed in a vacuum degasser for degassing to remove gas between tissue cells to obtain the third mixed liquid;

(4) preparation of the pickled vegetable-based edible packaging paper: said third mixed liquid is poured and uniformly applied onto a forming support, then baked and dried; a dried paper sheet is separated from said forming support to obtain the pickled vegetable-based edible packaging paper.

2. The pickled vegetable-based edible packaging paper of claim 1, wherein a raw material of preparing said pickled vegetable is green mustard, said pickled vegetable is prepared by a method as follows:

100 weight parts of said green mustard is trimmed and cut, washed with water, drained, and then treated at an pressure of 400 MPa for 15 min, 400 weight parts of a pickling brine comprising salt at a mass concentration of 4% and white granulated sugar at a mass concentration of 3% is added, along with 9 weight parts of *Lactobacillus plantarum* and 1.5 weight parts of Pediococcusto get a mixture, and said mixture is poured into a sterilized pickling jar, fed in with seasoning, and then placed in an incubator for fermentation at 25° C. for 5 days.

* * * * *